United States Patent
Tsutsui et al.

[11] Patent Number: 5,931,761
[45] Date of Patent: Aug. 3, 1999

[54] SHIFT CONTROL DEVICE FOR AUTOMATIC TRANSMISSION

[75] Inventors: Hiroshi Tsutsui; Masaaki Nishida; Yoshihisa Yamamoto; Akitomo Suzuki; Takayuki Kubo, all of Anjo, Japan

[73] Assignee: Aisin AW Co., Ltd., Anjo, Japan

[21] Appl. No.: 09/006,899

[22] Filed: Jan. 14, 1998

[30] Foreign Application Priority Data

Jan. 30, 1997 [JP] Japan ..................... 9-017228

[51] Int. Cl.[6] .................................................. F16H 61/26
[52] U.S. Cl. ........................... 477/118; 477/156; 477/164
[58] Field of Search ................... 477/118, 156, 477/164

[56] References Cited

U.S. PATENT DOCUMENTS 4,098,148  7/1978  Wayman ............................ 477/127
5,203,235  4/1993  Iizuki .............................. 477/118 X

FOREIGN PATENT DOCUMENTS

A-63-219949  9/1988  Japan .

Primary Examiner—Charles A. Marmor
Assistant Examiner—Sherry Lynn Estremsky
Attorney, Agent, or Firm—Oliff & Berridge, PLC

[57] ABSTRACT

In a driven state, a hydraulic pressure of disengagement side is set at a stroke pressure, a one-way clutch in an operating state is over-run, an engine rotation speed is in an idle state, and an automatic transmission is in a neutral state. In a drive state, the hydraulic pressure of disengagement side is controlled so that a difference between an engine rotation speed and an input rotation speed reaches a difference between the both rotation speeds at a start of the shift control. In a state of a synchronized rotation after the shift, the hydraulic pressure of disengagement side is controlled so that the input rotation reaches the synchronized rotation.

8 Claims, 9 Drawing Sheets

|     | C1 | C2 | C3 | B1 | B2 | B3 | B4 | B5 | F1 | F2 |
|-----|----|----|----|----|----|----|----|----|----|----|
| N   |    |    |    |    |    |    |    | O  |    |    |
| 1ST | O  |    |    |    |    | ◌  |    | O  |    | O  |
| 2ND | O  |    |    | □  | O  |    |    | O  | O  |    |
| 3RD | O  |    |    | O  | O  |    | O  |    | O  |    |
| 4TH | O  |    | O  | O  | O  |    |    |    | O  |    |
| 5TH | O  | O  | O  |    | O  |    |    |    |    |    |
| 3Low| O  | O  |    |    | O  |    |    | O  |    |    |
| 4Low| O  | O  |    |    | O  |    | O  |    |    |    |
| REV |    | O  |    |    |    | O  |    | O  |    |    |

◌ : Engine Brake   □ : Operated with Necessity

SHIFT CONTROL DEVICE FOR AUTOMATIC TRANSMISSION

BACKGROUND OF THE INVENTION

1. Field of Invention

The invention relates to a shift control device for an automatic transmission mounted on a vehicle. More specifically, it relates to a shift control device performing coast down shift by changing over between a frictional engagement element of disengagement side and a frictional engagement element of engagement side, that is to say, a clutch to clutch shift.

2. Description of the Related Art

An automatic transmission has a first shaft and a second shaft arranged in parallel with each other. A main transmission mechanism is arranged on the first shaft and a auxiliary transmission mechanism is arranged on the second shaft. The main transmission mechanism achieves three forward ratios and one reverse ratio. The auxiliary transmission mechanism achieves three forward ratios. The automatic transmission achieves multistage, for example, five forward ratios, by the combination of the ratios of the main transmission mechanism and the auxiliary transmission mechanism.

In the automatic transmission, a down shift is performed when an accelerator pedal is released and a foot brake is operated, that is, a coast down shift is performed. For example, when the automatic transmission is shifted from the third ratio to the second ratio, a fourth brake of the auxiliary transmission mechanism is disengaged and a fifth brake of the auxiliary transmission mechanism is engaged. In this state, the main transmission mechanism is kept in a predetermined gear ratio (for example, second ratio) wherein a frictional engagement element for coast state is engaged. The frictional engagement element for coast state is, for example, a first brake arranged in parallel with a second brake interposed with a one-way clutch in series.

Figure 10:
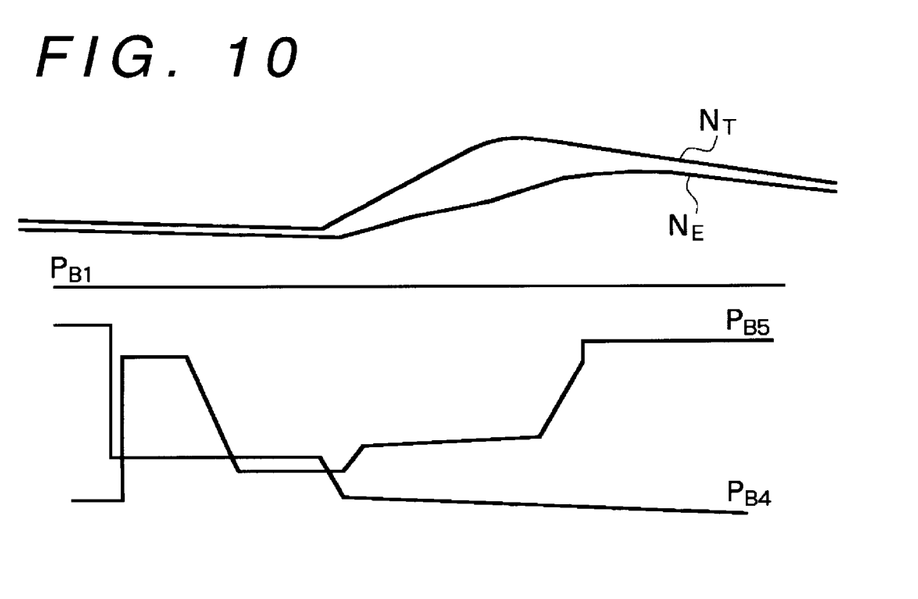
FIG. 10 is timing charts showing coast down shift in the related art.

In the aforementioned automatic transmission, when the coast down shift is performed, especially at a high vehicle speed, as shown in FIG. 10, a hydraulic pressure of engagement side is increased and thus the fifth brake is engaged, and a hydraulic pressure of disengagement side is placed in a state for disengaging. Therefore, an input rotation speed is fairly increased. As a result, a momentary big engine brake feeling is incurred based on a difference between the input rotation speed and the engine rotation speed, and a driver may be uncomfortable. On the other hand, when the coast down shift is performed at a low vehicle speed wherein the engine brake is not achieved, but the down shift is late. Therefore, when an acceleration is required again, a time lag occurs because of the lateness of the down shift. In this case, even when the automatic transmission is in the coast down state, in case where the deceleration rate is small, the automatic transmission is in a driven (negative drive) state wherein a torque is transmitted from the vehicle wheels to the engine. On the other hand, in case where the deceleration rate is large, a input shaft rotation speed becomes less than the engine idle rotation speed, and the automatic transmission is in a drive (positive drive) state wherein a torque is transmitted from the engine to the vehicle wheels. At that time, the hydraulic pressure for the first brake as the frictional engagement element for coast state is kept at a pressure for engagement. Therefore, the main transmission mechanism is kept in the state of the second ratio irrespective of the drive state or the driven state because of the engagement of the first brake.

SUMMARY OF THE INVENTION

In view of the above problems associated with the prior art, an object of the invention is to provide a shift control device for an automatic transmission which uses an one-way clutch arranged in parallel with a frictional engagement element for an effective state by disengaging a frictional engagement element for the coast state arranged on the up stream side of frictional engagement elements used for a clutch to clutch shift in the transmission line, and always performs a proper shift control by performing a proper hydraulic control based on a deceleration rate in a coast down shift.

In order to achieve the object, according to an embodiment of the invention, a shift control device for an automatic transmission comprises an automatic transmission mechanism changing a speed of an input rotation from an engine output shaft and changing a transmission route by disengaging and engaging a plurality of frictional engagement elements, and outputting the changed rotation speed to vehicle wheels, hydraulic servos for engaging and disengaging of each frictional engagement element, two frictional engagement elements of the plurality of frictional engagement elements directly connected to different rotational elements of the automatic transmission mechanism respectively and used for a coast down shift caused when one of the two frictional engagement elements is engaged while the other of the two frictional engagement elements is disengaged, a drive state detecting device for detecting a drive state or a driven state based on an engine rotation speed and an input rotation speed, a hydraulic pressure adjusting device for adjusting a hydraulic pressure for at least the hydraulic servo of disengagement side of the two frictional engagement element, a frictional engagement element for a coast state connected to a predetermined rotational element, which is arranged between the engine and the rotational elements connected to the two frictional engagement elements of the plurality of frictional engagement elements in the transmission line of the automatic transmission mechanism, in parallel with an one-way clutch, and a hydraulic control device for disengaging the frictional engagement element connected to the predetermined rotational element for the coast state and outputting a control signal to the hydraulic pressure adjusting device when the coast down shift is performed.

Moreover, the hydraulic control device controls the hydraulic pressure for the other of the two frictional engagement elements of the plurality of frictional engagement elements which is disengaged at the coast down shift hydraulic servo to reach to a predetermined low pressure, which is, for example, a stroke pressure which places the hydraulic servo in the state of just before having a torque capacity, when the drive state detecting means detects a driven state.

Moreover, the hydraulic control device performs a feedback control to the hydraulic pressure for the hydraulic servo so that a difference between the engine rotation speed and the input rotation speed reaches a difference between the engine rotation speed and the input rotation speed at start of the coast down shift control when the drive state detecting device detects a drive state.

Moreover, the hydraulic control device performs a feedback control to the hydraulic pressure for the hydraulic servo so that the input rotation speed reaches a synchronized rotation speed, after a synchronized rotation speed after the coast down shift is detected.

According to the invention, the one-way clutch arranged in parallel with the frictional engagement element for the coast state is used effectively by disengaging the frictional engagement element arranged on the up stream side of the frictional engagement elements for the coast state in the transmission line. The shift control is always performed properly, and the feeling of an excessive engine brake and shift shock are prevented by the adjusting control of a hydraulic pressure of the disengagement side.

According to the invention, moreover, when the automatic transmission is in the driven state and a deceleration rate is small, the hydraulic pressure of the disengagement side is kept at the predetermined low pressure and the one-way clutch is over-run. As a result, a shift shock, based on a large change of the rotation during the shift because of too much release of the hydraulic pressure of the disengagement side is prevented. Further, a slow-motion shift based on too high pressure of the disengagement side is also prevented.

Moreover, when the automatic transmission is in the drive state, a rotation change during the shift control is suppressed to a minimum. Therefore, a moving to an another ratio, for example, neutral, because of too much reduction of the hydraulic pressure of the disengagement side is prevented. Further, an engine surge occurred when the accelerator pedal is operated again is prevented and a time lag because of late disengagement of the disengagement pressure is prevented.

Further, the input rotation speed is controlled to synchronize with the synchronized rotation which is the input rotation speed after the shift is detected. As a result, an engine surge because of late engagement of the one of the two frictional engagement elements is prevented, and a shift shock is prevented.

BRIEF DESCRIPTION OF THE DRAWINGS

The invention will be described in conjunction with the following drawings in which like features are designated with like reference characters, wherein.

DETAILED DESCRIPTION OF PREFERRED EMBODIMENTS

The invention will become more apparent from the following detailed description of preferred embodiments with reference to the accompanying drawings.

Figure 1:
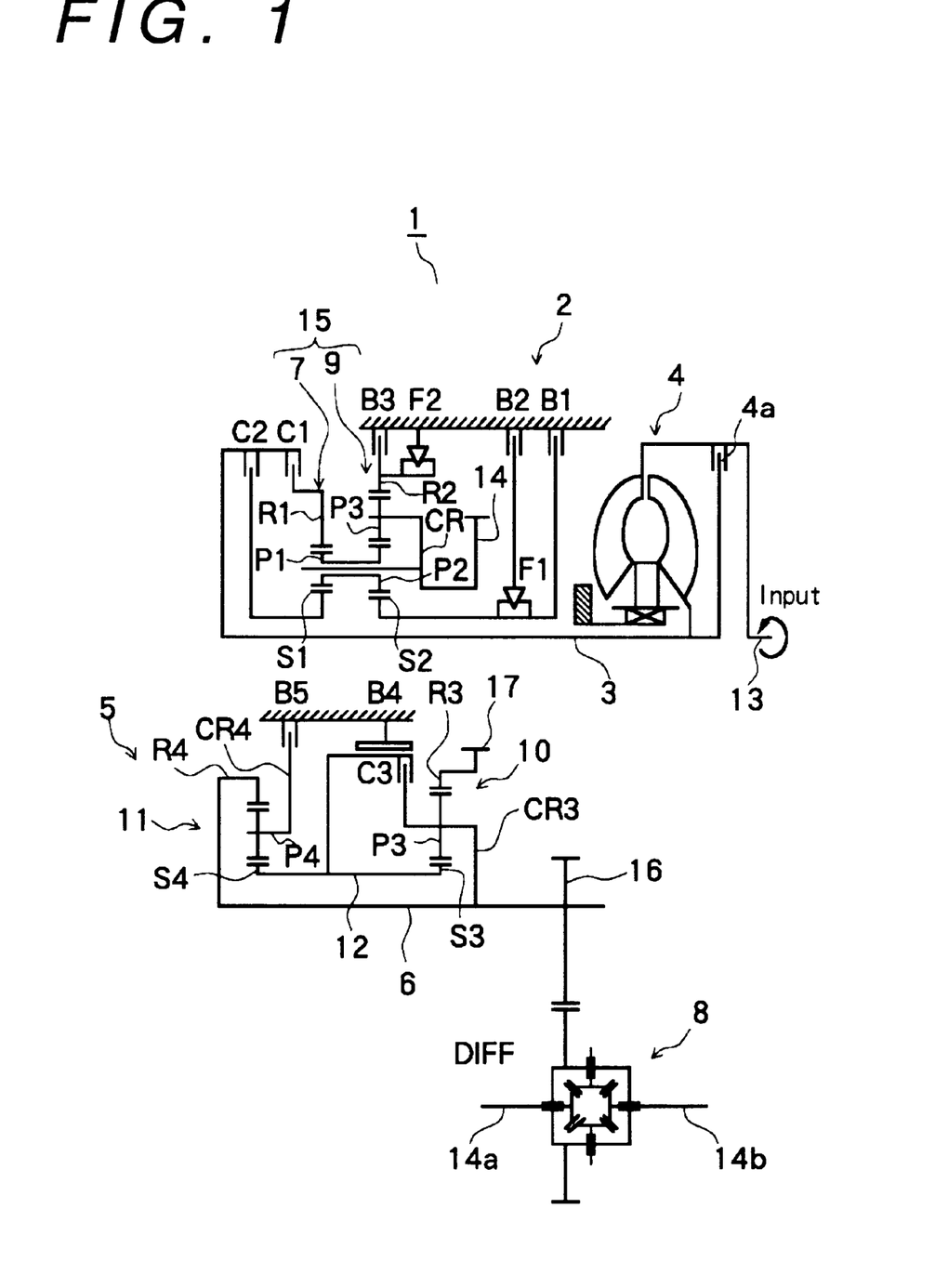
FIG. 1 is a schematic diagram illustrating an automatic transmission of the invention.

As shown in FIG. 1, a 5-speed automatic transmission 1 comprises a torque converter 4, a 3-speed main transmission mechanism 2, a 3-speed auxiliary transmission mechanism 5 and a differential unit 8. These components are connected to each other to form a single structure accommodated in a case. The torque converter 4, which is provided with a lock-up clutch 4a, receives torque from an engine crank shaft 13, supplying the torque to an input shaft 3 of the main transmission mechanism 2 through a hydraulic flow in the torque converter 4 or through the mechanical joint of the lock-up clutch 4a. The first shaft 3 (input shaft) aligned with the crank shaft, the second shaft 6 (counter shaft) arranged parallel to the first shaft 3, and the third shaft 14a, 14b (a left-right vehicle shaft) are rotatably supported in the case. A valve body is established on the outside of the case.

The main transmission mechanism 2 has a planetary gear unit 15 as a gear unit which comprises a simple planetary gear 7 and a double-pinion planetary gear 9. The simple planetary gear 7 comprises a sun gear S1, a ring gear R1 and a carrier CR for supporting a pinion P1. The pinion P1 is engaged with sun gear S1 and ring gear R1. The double-pinion planetary gear 9 comprises the sun gear S2, having a different number of gear teeth than sun gear S1, a ring gear R2 and the carrier CR shared with the simple planetary gear 7 for supporting the pinion P2 and a pinion P3 of the double-pinion planetary gear 9. The pinion P2 is engaged with the sun gear S2, and the pinion P3 is engaged with the ring gear R2.

The input shaft 3, which is associated with the crank shaft 13 through the torque converter 4, can be linked to the ring gear R1 of the simple planetary gear 7 through a first (forward) clutch C1 and to the sun gear S1 of the simple planetary gear 7 through a second (direct) clutch C2. The sun gear S2 of the double-pinion planetary gear 9 can be stopped from rotation directly by a first brake B1 as a first frictional engagement element and stopped by a second brake B2 as a second frictional engagement element through a first one-way clutch F1. The ring gear R2 of the double-pinion planetary gear 9 can be stopped from rotation by a third brake B3 and a second one-way clutch F2. The common carrier CR is linked to a counter drive gear 14, which serves as an output member of the main transmission mechanism 2.

The auxiliary transmission mechanism 5 comprises an output gear 16, a first simple planetary gear 10 as a gear unit and a second simple planetary gear 11 as a gear unit, which are arranged sequentially in the axial direction of the second shaft 6 serving as a counter shaft toward the rear side. The counter shaft 6 is rotatably supported by the case through a bearing. The first and second simple planetary gears 10, 11 are both of the Simpson type.

As for the first simple planetary gear 10, a ring gear R3 is connected to a counter driven gear 17, which is engaged with the counter drive gear 14. A sun gear S3 is fixed to a sleeve shaft 12, which is rotatably supported by the counter shaft 6. A pinion P3 is supported by a carrier CR3, and a flange of carrier CR3 has an end thereof connected to the counter shaft 6 to form an assembly. The other end of the carrier CR3 is connected to an inner hub of a third (UD direct) clutch C3. As for the second simple planetary gear 11, a sun gear S4 is formed on the sleeve shaft 12 and connected to the sun gear S3 of the first simple planetary gear 10. A ring gear R4 is linked to the counter shaft 6.

The UD direct clutch C3 is provided between the carrier CR3 and the sleeve shaft 12 connecting the sun gear S3 to the sun gear S4. The sun gear S3 and the sun gear S4 can be stopped from rotation by a fourth brake B4 serving as a band brake. A carrier CR4 supporting a pinion P4 of the second simple planetary gear 11 can be stopped by a fifth brake B5.

Next, operation of the mechanisms of the 5-speed automatic transmission will be explained with reference to FIGS. 1 and 2.

At a first ratio of the automatic transmission 1 in the D (drive) range, the forward clutch C1 is engaged, and the fifth brake B5 and the second one-way clutch F2 are also engaged, operating so as to maintain the ring gear R2 of the double-pinion planetary gear 9 and the carrier CR4 of the second simple planetary gear 11 in the stopped state. In this state, the rotation of the input shaft 3 is transmitted to the ring gear R1 of the simple planetary gear 7 through the forward clutch C1. In addition, since the ring gear R2 of the double-pinion planetary gear 9 is stopped, the common carrier CR is rotated in the positive direction at a substantially reduced rotational speed, while the sun gear S1 and the sun gear S2 are in a rotating state in the reverse direction. That is to say, the main transmission mechanism 2 is in the state of a first gear ratio and the rotation at the reduced rotational speed is transmitted to the ring gear R3 of the first simple planetary gear 10 in the auxiliary transmission mechanism 5 through the counter gears 14, 17. With the carrier CR4 of the second simple planetary gear 11 stopped, the auxiliary transmission mechanism 5 is also in the state of a first gear ratio. In this state, the rotation of the main transmission mechanism 2 at the reduced rotational speed is further slowed down by the auxiliary transmission mechanism 5 and outputted from an output gear 16.

At a second ratio of the automatic transmission 1, the second brake B2 (or the first brake B1) is engaged in addition to the engagement of the forward clutch C1. Furthermore, the engagement is switched over from the second one-way clutch F2 to the first one-way clutch F1 and the fifth brake B5 is maintained in the engaging state. In this state, the sun gear S2 is stopped from rotation by the second brake B2 and the first one-way clutch F1. As a result, the rotation of the ring gear R1 of the simple planetary gear 7, transmitted from the input shaft 3 through the forward clutch C1, causes the carrier CR to rotate in the positive direction while keeping the ring gear R2 of the double-pinion planetary gear 9 in a free rotating state in the positive direction. In addition, the rotation at the reduced rotational speed is transmitted to the auxiliary transmission mechanism 5 through the counter gears 14, 17. That is to say, the main transmission mechanism 2 is in the state of a second gear ratio while the auxiliary transmission mechanism 5 is in the state of the first gear ratio thereof due to the engagement of the fifth brake B5. As a result of combining the state of the second gear ratio of the main transmission mechanism 2 and the state of the first gear ratio of the auxiliary transmission mechanism 5, the second ratio is obtained in the automatic transmission 1 as a whole. At that time, the first brake B1 may be operated, but when the second ratio is achieved by a coast down shift, the first brake B1 is disengaged as described later.

At a third ratio of the automatic transmission 1, the forward clutch C1, the second brake B2, the first one-way clutch F1 and the first brake B1 are maintained in the engaged state. In addition, the engagement of the fifth brake B5 is released while, at the same time, the fourth brake (band brake) B4 is engaged. That is to say, the main transmission mechanism 2 is sustained in the second ratio state and the rotation at the second gear ratio is transmitted to the auxiliary transmission mechanism 5 through the counter gears 14, 17. In addition, in the auxiliary transmission mechanism 5, the rotation from the ring gear R3 of the first simple planetary gear 10 is outputted from the carrier CR3 as a rotation at a second gear ratio due to the fact that the sun gear S3 is stopped. As a result of combining the state of the second gear ratio of the main transmission mechanism 2 and the state of the second gear ratio of the auxiliary transmission mechanism 5, the third ratio is obtained in the automatic transmission 1 as a whole.

At a fourth ratio of the automatic transmission 1, the main transmission mechanism 2 is in the same state as the above states at the second and third ratios of the automatic transmission 1 wherein the forward clutch C1, the second brake B2, the first one-way clutch F1 and the first brake B1 are engaged. In the auxiliary transmission mechanism 5, on the other hand, the fourth brake (band brake) B4 is disengaged while the UD direct clutch C3 is engaged. In this state, the carrier CR3, the sun gear S3 of the first simple planetary gear 10 and the sun gear S4 of the second simple planetary gear 11 are connected, placing the first and second simple planetary gears 10, 11 in a directly-coupled state wherein the first and second simple planetary gears 10, 11 both rotate integrally. As a result of combining the state of the second gear ratio of the main transmission mechanism 2 and the state of a third gear ratio, that is, the directly-coupled state of the auxiliary transmission mechanism 5, a rotation of the fourth ratio in the automatic transmission 1 as a whole is outputted from the output gear 16.

At a fifth ratio of the automatic transmission 1, the forward clutch C1 and the direct clutch C2 are engaged and the rotation of the input shaft 3 is transmitted to the ring gear R1 and the sun gear S1 of the simple planetary gear 7. The main transmission mechanism 2 is thus in a directly-coupled state wherein the planetary gear unit 15 rotates integrally. At that time, the first brake B1 is disengaged and the second brake B2 is kept engaged, but the sun gear S2 is over-run because the first one-way clutch F1 is over-run. In addition, the auxiliary transmission mechanism 5 is in a directly-coupled state with the third (UD direct) clutch C3 engaged. As a result of combining the state of a third gear ratio, that is, the directly-coupled state of the main transmission mechanism 2 and the state of the third gear ratio, that is, the directly-coupled state of the auxiliary transmission mechanism 5, a rotation at the fifth ratio in the automatic transmission 2 as a whole is outputted from the output gear 16.

Furthermore, the automatic transmission 1 also has intermediate ratios, that is, a third low ratio and a fourth low ratio which are operated during a down shift for acceleration for example.

At the third low ratio, the forward clutch C1 and the direct clutch C2 are engaged. Actually, the second brake B2 is also engaged but is over-run by the one-way clutch F1. The main transmission mechanism 2 is in a state of the third gear ratio with the planetary gear unit 15 coupled. On the other hand, the fifth brake is engaged, putting the auxiliary transmission mechanism 5 in a state of the first gear ratio. As a result of combining the state of the third gear ratio of the main transmission mechanism 2 and the state of the first gear ratio of the auxiliary transmission mechanism 5, a ratio between the second and third ratios, that is, the third low ratio is obtained in the automatic transmission 1 as a whole.

At the fourth low ratio, the forward clutch C1 and the direct clutch C2 are engaged, putting the main transmission mechanism 2 in a state of the third gear ratio with the planetary gear unit 15 put in a directly-connected-rotation state as is the case in the state of the third low ratio. On the other hand, the fourth brake (band brake) B4 is engaged and the sun gear S3 of the first simple planetary gear 10 is halted, putting the auxiliary transmission mechanism 5 in a state of the second gear ratio. As a result of combining the state of third gear ratio of the main transmission mechanism 2 and the state of the second gear ratio of the auxiliary transmission mechanism 5, a ratio between the third and fourth ratios, that is the fourth low ratio is obtained in the automatic transmission 1 as a whole.

Figure 2:
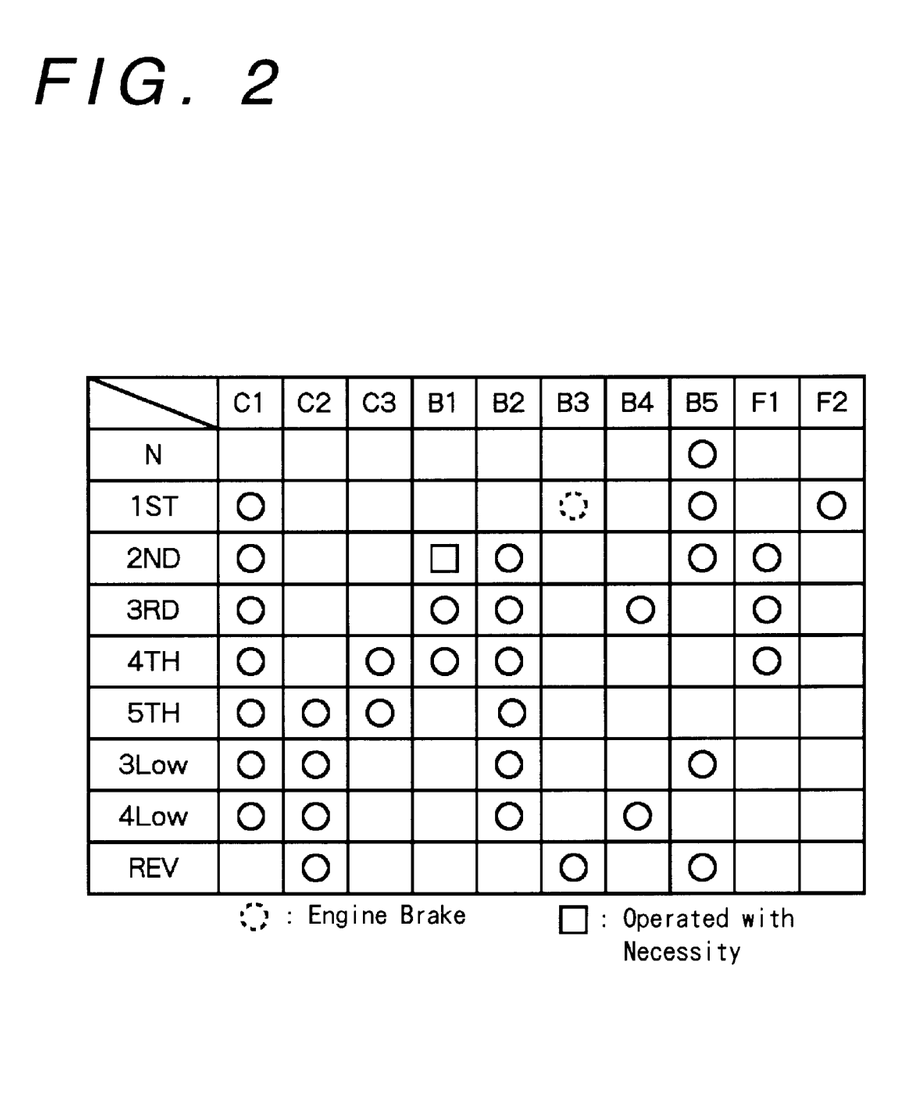
FIG. 2 is a table showing the operation of the automatic transmission as shown in FIG. 1.

It should be noted that each dotted-line circle shown in FIG. 2 indicates that a coasting engine brake is working. That is to say, at the first ratio, the third brake B3 is engaged, halting the rotation of the ring gear R2 caused by an over-run of the second one-way clutch F2.

In the R (reverse) range, the direct clutch C2 and the third brake B3 are both engaged and, at the same time, the fifth brake B5 is also engaged. In this state, the rotation of the input shaft 3 is transmitted to the sun gear S1 of the simple planetary gear 7 through the direct clutch C2 and the ring gear R2 of the double-pinion planetary gear 9 is stopped by the third brake B3. As a result, while the ring gear R1 of the simple planetary gear 7 is put in a rotation state in the reverse direction, the carrier CR is also rotated in the reverse direction. This rotation in the reverse direction is transmitted to the auxiliary transmission mechanism 5 through the counter gears 14 and 17. The carrier CR4 of the second simple planetary gear 11 is stopped also in the reverse rotational direction by the fifth brake B5, maintaining the auxiliary transmission mechanism 5 in the state of the first gear ratio thereof. As a result of combining the rotation of the main transmission mechanism 2 in the reverse direction and the rotation of the auxiliary transmission mechanism 5 at the first gear ratio, a rotation at a reduced rotational speed in the reverse direction is outputted from the output gear 16.

Figure 3:
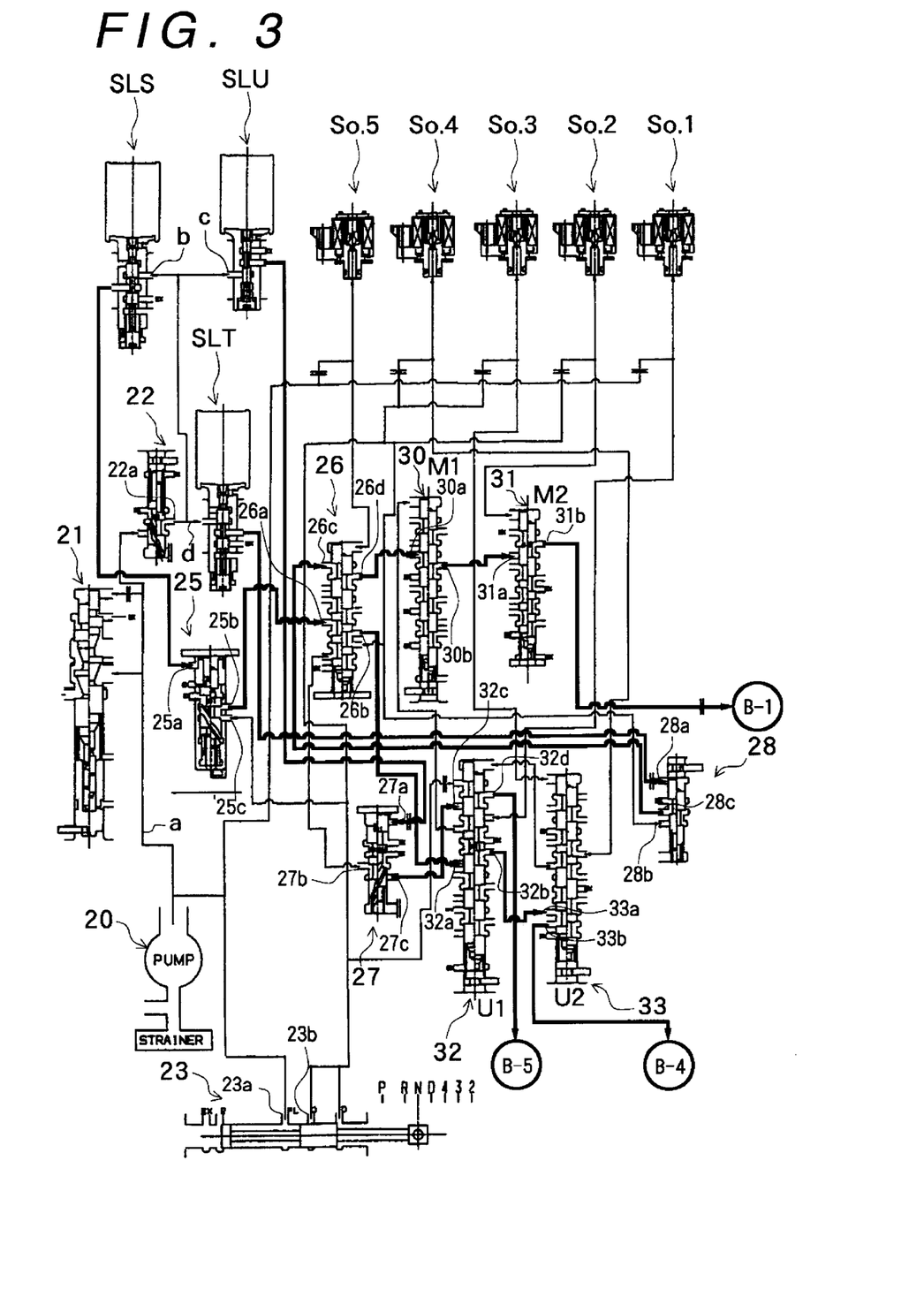
FIG. 3 is a diagram showing a part of the hydraulic control circuit of the automatic transmission of the automatic transmission as shown in FIG. 1.

Next, a hydraulic control circuit of the 5-speed automatic transmission will be explained with reference to FIG. 3. The hydraulic control circuit in FIG. 3 shows only the components of the hydraulic control circuit that are necessary for explaining the operation of the embodiment. The actual circuit comprises many additional components and is a complicated circuit.

In FIG. 3, notations So. 1, So. 2, So. 3, So. 4, and So. 5 denote solenoid valves for performing ON-OFF control. The solenoid valves So. 1 and So. 4 are normally-open type solenoids, and the solenoid valves So. 2, So. 3 and So. 5 are normally-closed type solenoids. A notation SLS denotes a first linear solenoid valve as a first hydraulic pressure adjusting device, a notation SLU denotes a second solenoid valve as second hydraulic pressure adjusting device, and a notation SLT denotes a third solenoid valve as a third hydraulic pressure adjusting device. The first linear solenoid valve SLS is exclusively used for adjusting a hydraulic pressure applied to hydraulic servos. The second linear solenoid valve SLU is mainly used for performing a slip-control to the lock-up clutch and is also used for adjusting the hydraulic pressure applied to the hydraulic servos. The third linear solenoid valve SLT is mainly used for making a throttle pressure according to a throttle opening and is also used for adjusting the hydraulic pressure applied to the hydraulic servos.

Reference numeral 20 denotes an oil pump and reference numeral 21 denotes a primary regulator valve. The primary regulator valve 21 regulates a hydraulic pressure, outputted from the hydraulic pump 20, to a line pressure based on a hydraulic pressure which is a throttle pressure outputted from the third linear solenoid valve (SLT), and outputs the line pressure to a line-path a. Reference numeral 22 denotes a solenoid modulator valve. The solenoid modulator valve 22 reduces the line pressure, and outputs the reduced hydraulic pressure from an output port 22a to an input port b of the first linear solenoid valve SLS, an input port c of the second linear solenoid valve SLU and an input port d of the third linear solenoid valve SLT respectively.

Reference numeral 23 denotes a manual valve. The manual valve 23 connects a line pressure port 23a to one of each output port thereof in accordance with an operational position of a shift lever. For example, when the shift lever is placed at a position D, 4, 3, or 2, the line pressure port 23a is connected to an output port 23b.

Reference numeral 25 denotes a shift pressure control valve, which is a modulator valve, reference numeral 26 denotes a pressure relay valve which is a hydraulic pressure relay valve, reference numeral 27 denotes a B5 control valve, which is a modulator valve, and reference numeral 28 denotes a B1 control valve, which is a modulator valve. Reference numeral 30 denotes a first (M1) shift valve for the main transmission mechanism 2, reference numeral 31 denotes a second (M2) shift valve for the main transmission mechanism 2, reference numeral 32 denotes a first (U1) shift valve for the auxiliary transmission mechanism 5, and reference numeral 33 denotes a second (U2) shift valve for the auxiliary transmission mechanism 5. The shift pressure control valve 25 is operated by a control pressure applied from the first linear solenoid valve SLS to an oil chamber 25a, and properly modulates the line pressure applied to a port 25c. The modulated pressure is outputted from an output port 25b. The B5 control valve 27 is operated by a control pressure applied from the second linear solenoid valve SLU to an oil chamber 27a, and modulates the line pressure applied from an input port 27b properly. The modulated pressure is outputted from an output port 27c. The B1 control valve 28 is operated by a control pressure applied from the third linear solenoid valve SLT to an oil chamber 28a, and properly modulates the line pressure applied from an input port 28b. The modulated pressure is outputted from an output port 28c.

Notation B-4 denotes a fourth hydraulic servo for the fourth brake B4, Notation B-5 denotes a fifth hydraulic servo for the fifth brake B5, and Notation B-I denotes a first hydraulic servo for the first brake Bl. Hydraulic pressures are applied to these hydraulic servos (B-4, B-5, B-1) or drained from these hydraulic servos (B-4, B-5, B-1) by changing the position of spools within shift valves 30, 31, 32, 33.

In a shift from third gear ratio to second gear ratio, hydraulic pressure to the hydraulic servo B-5 for the fifth brake B5 and hydraulic pressure to the hydraulic servo B-4 for the fourth brake B4 are controlled. Further, a hydraulic pressure to the hydraulic servo B-1 for the first brake B1 is controlled. At that time, an adjusted pressure from the shift pressure control valve 25, controlled by the first linear solenoid valve SLS, is applied to the hydraulic servo B-4 for the fourth brake B4; an adjusted pressure from the B5 control valve 27, controlled by the second line solenoid valve SLU, is applied to the hydraulic servo B-5 for the fifth brake B5; and an adjusted pressure from the B1 control valve 28, controlled by the third linear solenoid valve SLT, is applied to the hydraulic servo B-1 for the first brake B1. That is to say, the adjusted pressure from the output port 25b of the shift pressure control valve 25 is applied to the hydraulic servo B-4 for the fourth brake B4 through ports 26a, 26b of the pressure relay valve 26 in a position as shown on the left-half side of FIG. 3, ports 32a, 32b of the U1 shift valve 32 in a position as shown on the right-half side, and ports 33a, 33b of the U2 shift valve 33 in a position as shown on the left-half side. The adjusted pressure from the output port 27c of the B5 control valve 27 is applied to the hydraulic servo B-5 for the fifth brake B5 through ports 32c, 32d of the U1 shift valve 32 in a position as shown on the right-half side. Further, the adjusted pressure from the output port 28c of the B1 control valve 28 is applied to the hydraulic servo B-1 for the first brake B1 through ports 26c, 26d of the pressure relay valve 26 in a position as shown on the left-half side, and ports 30a, 30b of the M1 shift valve 30 in a position as shown on the left-half side, and ports 31a, 31b of the M2 shift valve 31 in a position as shown on the right-half side.

Figure 4:
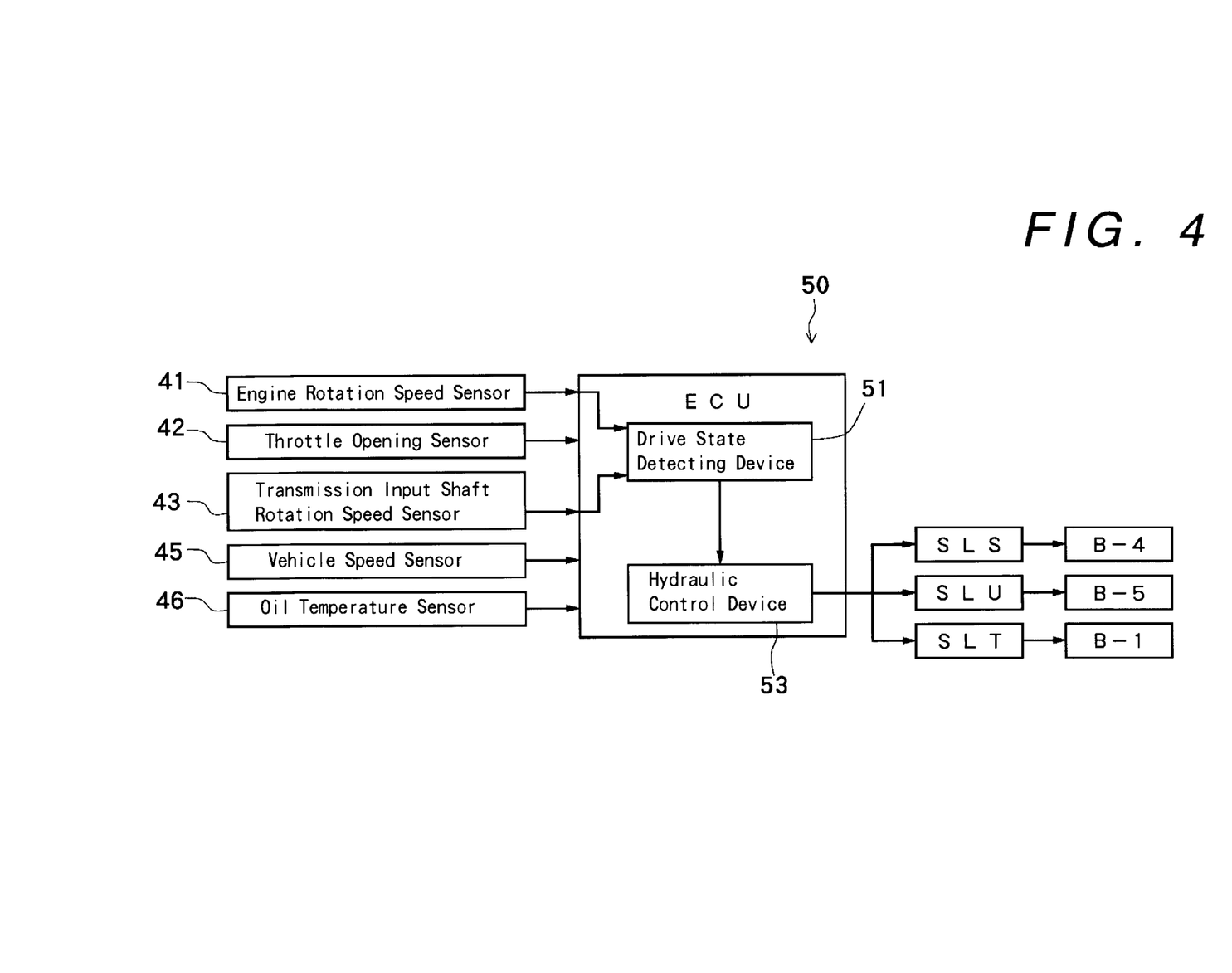
FIG. 4 is a block diagram showing an electrical control in accordance with the invention.

FIG. 4 is a block diagram showing the electronic control. Reference numeral 50 denotes an electronic control unit (ECU) comprising a micro computer or processor. The electrical control unit 50 is inputted signals from an engine rotation speed sensor 41, a throttle opening sensor 42, a sensor 43 for detecting an input shaft rotation speed, which is a turbine rotation speed of an automatic transmission mechanism, a vehicle speed sensor 45 for detecting an output shaft rotation speed of the automatic transmission, and an oil temperature sensor 46 respectively. The electric control unit 50 outputs signals to the linear solenoid valves SLS, SLU and SLT in the hydraulic control circuit. The electric control unit 50 comprises a drive state detecting device 51 for detecting a drive state, in which the torque is transmitted from an engine to vehicle wheels, or a driven state, in which the torque is transmitted from the vehicle wheels to the engine. When the drive state is detected, the input torque is defined to be positive, and when the driven state is detected, the input torque is defined to be negative. Further, the electric control unit 50 comprises a hydraulic control device 53 for outputting adjusting control signals to the three linear solenoid valves SLS, SLU and SLT. The drive state detecting device 51 detects the nature of the torque by comparing an engine rotation speed $N_E$ from the sensor 41 and an input rotation speed $N_T$ from the sensor 43.

Next, the coast down control of the invention applied to the shift from the third gear ratio to the second gear ratio will be explained with reference to FIGS. 5 through FIG. 9.

The shift is determined by signals from the throttle opening sensor 41 and the vehicle speed sensor 42, that are based on the driver's operation of the accelerator pedal, based on a shift map stored in the electrical control unit 50. For example, the down-shift from the third gear ratio to the second gear ratio is determined. Then, with regard to a hydraulic pressure $P_{B4}$ for the fourth brake B4 which is a frictional engagement element of disengagement side, as shown in a flowchart of FIG. 7, a timer is started (S1) as a shift control is started after a predetermined time for changing the shift valve, for example, has elapsed.

Figure 7:
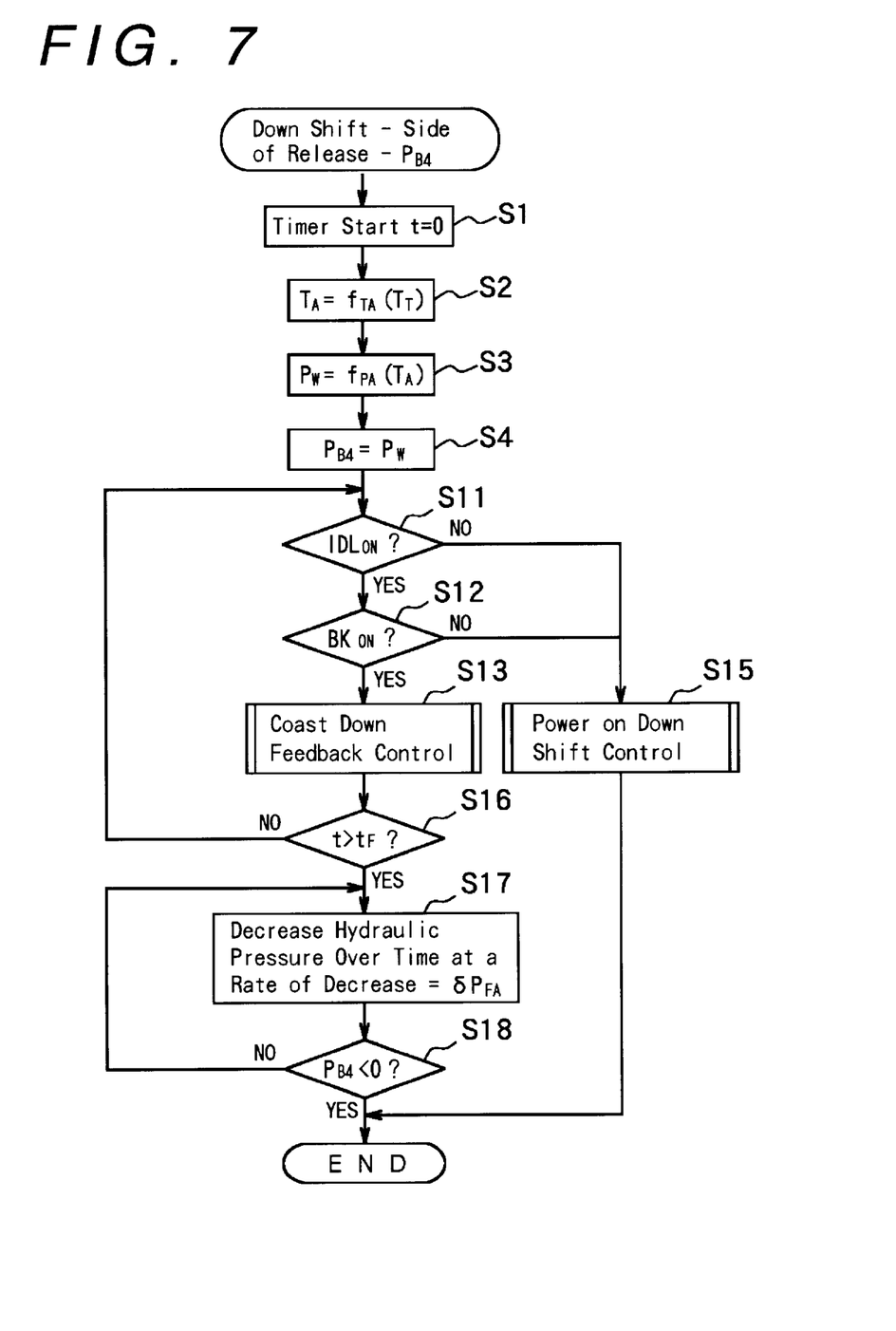
FIG. 7 is a flow chart showing hydraulic control of the disengagement side during coast down shift.

Then, an allotment torque of the disengagement side $T_A$ (=$1/a*T_T$; $1/a$: a torque allotment rate) corresponding to the input torque $T_T$ is calculated (S2). Further, a predetermined pressure $P_W$ is calculated based on the allotment torque $T_A$ of disengagement side (S3). The predetermined pressure $P_W$ is a pressure which makes the hydraulic pressure $P_{B4}$ of disengagement side have a predetermined torque capacity. Then, the control signal is output to the linear solenoid valve SLS so that the hydraulic pressure $P_{B4}$ for the fourth brake reaches the predetermined pressure $P_W$ calculated above (S4).

Figure 8:
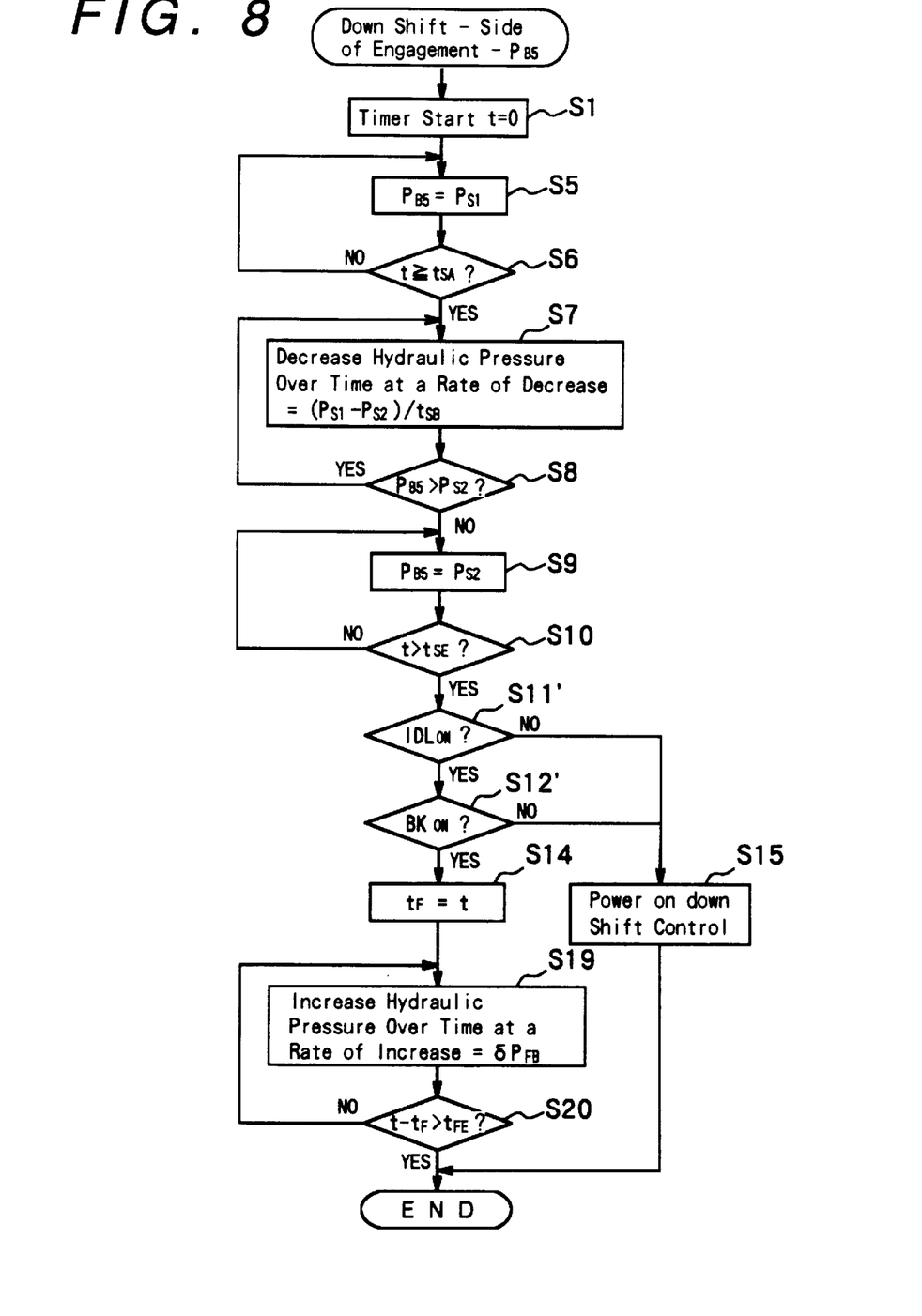
FIG. 8 is a flow chart showing hydraulic control of the engagement side during coast down shift.

On the other hand, with regard to a hydraulic pressure $P_{B5}$ for the fifth brake B5 which is a frictional engagement element of engagement side, as shown in FIG. 8, the timer is started based on the start of the shift control (S1) (S1 is the same in both FIGS. 7 and 8). At the same time, a predetermined signal $S_{S1}$ for making the hydraulic pressure $P_{B5}$ reach a predetermined pressure $P_{S1}$ is output to the linear solenoid valve SLU (S5). The predetermined pressure $P_{S1}$, which is a limited pressure, is set at a necessary hydraulic pressure for filling up a hydraulic chamber of the hydraulic servo B-5 and kept for a predetermined time $t_{SA}$. After the predetermined time tSA has elapsed (S6), the hydraulic pressure $P_{B5}$ is decreased over time with a predetermined rate of decrease $[(P_{S1}-P_{S2})/t_{SB}]$ (S7). When the hydraulic pressure $P_{B5}$ reaches a predetermined low pressure $P_{S2}$ (S8), the decrease over time is interrupted and the hydraulic pressure $P_{B5}$ is kept at the predetermined low pressure $P_{S2}$ (S9). The predetermined low pressure $P_{S2}$ is set to be more than a pressure required for a piston stroke within hydraulic servo B-5 and so that the rotation of the input shaft 3 is not changed. The hydraulic pressure $P_{B5}$ is kept at the predetermined low pressure $P_{S2}$ until a predetermined time $t_{SE}$ has elapsed (S10).

It is determined that a state of the accelerator pedal is in the off state (not depressed), that is, the existence of an idle on state is determined (S11, FIG. 7; S11', FIG. 8). Further, it is determined whether the brake pedal is pressed, that is, whether the brake is on is determined (S12, FIG. 7; S12', FIG. 8). When the idle on and the brake on are detected, a coast down feedback control discussed below, is applied to the hydraulic pressure $P_{B4}$ of disengagement side (S13). A predetermined time $t_F$ is set for the control for the hydraulic pressure $P_{B5}$ of the engagement side (S14). When the idle off (S11, FIG. 7; S11'; FIG. 8) or the brake off (S12, FIG. 7.; S12', FIG. 8) is determined, for example, when the accelerator pedal is pressed and a torque is required, a power on down shift control is performed (S15). The explanation of the power on down shift is omitted because this control has no relationship with the invention.

In the control for the hydraulic pressure $P_{B4}$ of disengagement side, when the time $t_F$ has elapsed and the coast down feedback control discussed below is ended (S16), the hydraulic pressure $P_{B4}$ of disengagement side is decreased over time with a predetermined rate of decrease $\delta P_{FA}$ (S17), a drain of the hydraulic pressure $P_{B4}$ of disengagement side is ended (S18), and the control is ended. On the other hand, in the control for the hydraulic pessure $P_{B5}$ of engagement side, the hydraulic pressure $P_{B5}$ of engagement side is increased over time with a predetermined rate of increase $\delta P_{FB}$ (S19), the hydraulic pressure of engagement side $P_{B5}$ reaches an engagement pressure after keeping the sweep up for the predetermined time $t_{FE}$ (S20), then the control is ended.

Figure 5:
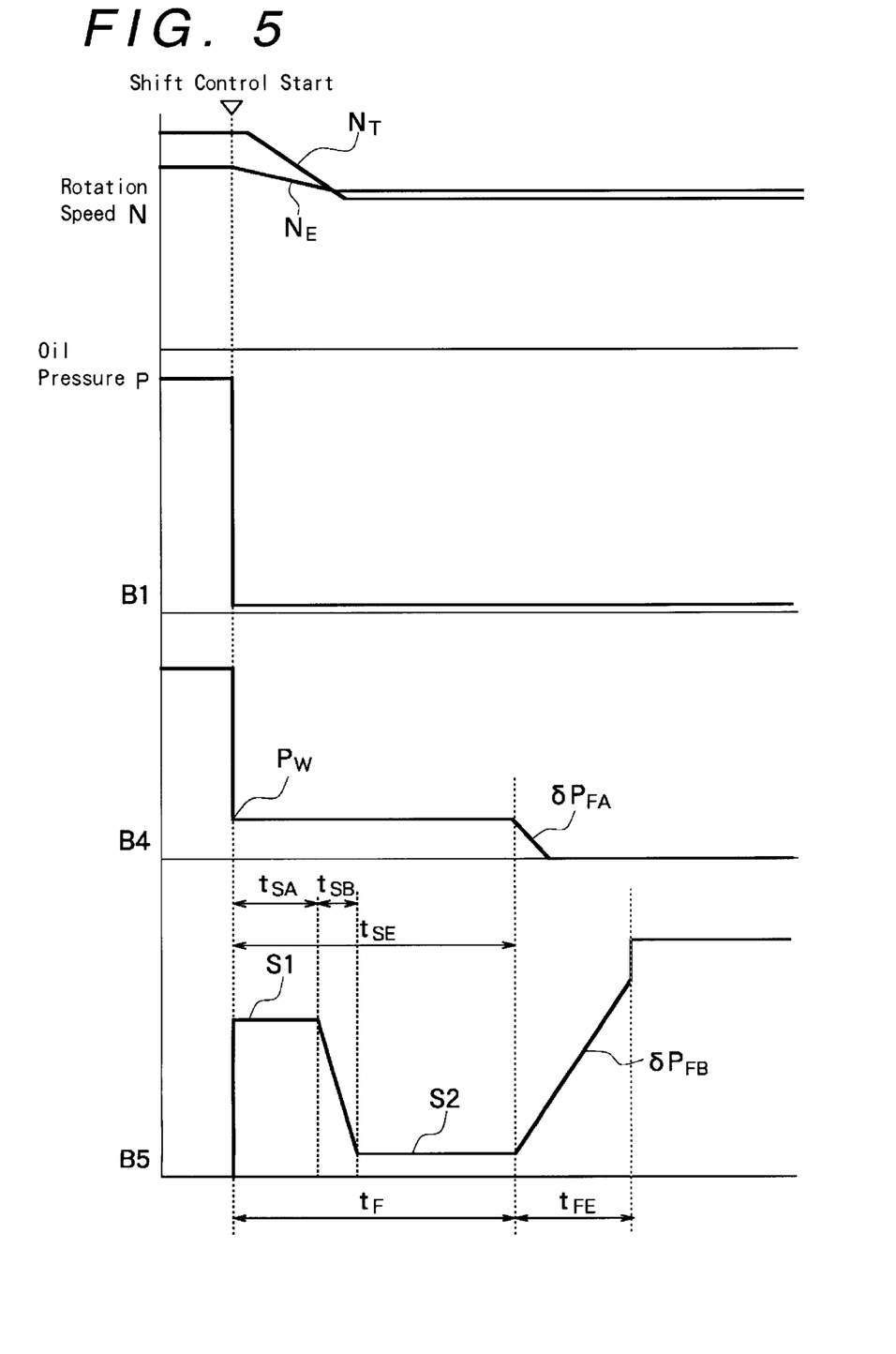
FIG. 5 is a timing chart for coast down shift with a small deceleration rate.
Figure 6:
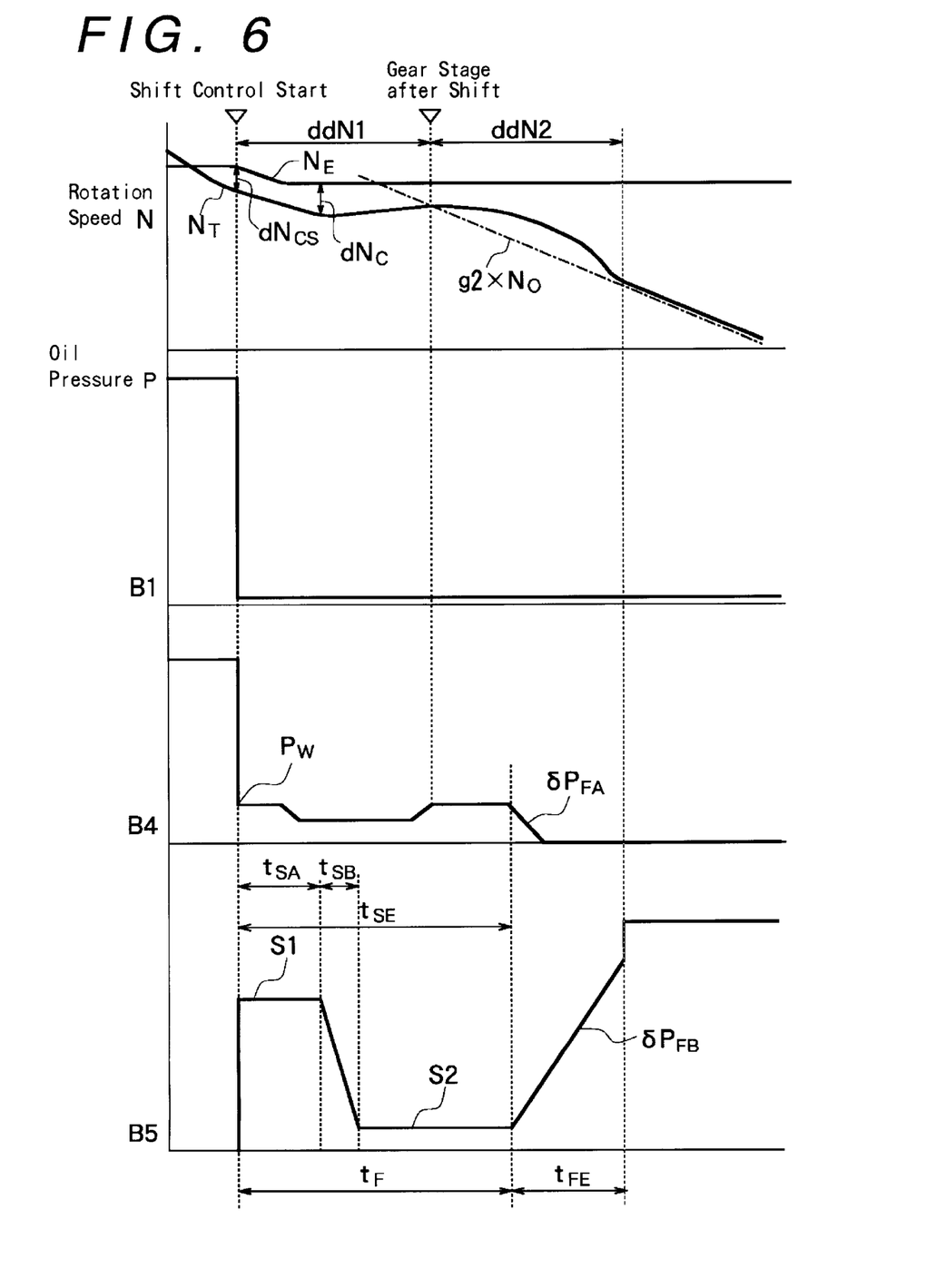
FIG. 6 is a timing chart for coast down shift with a large deceleration rate.

Flowcharts are omitted, but as shown in FIGS. 5 and 6, when the shift control is started (t=0), a control signal for a disengagement pressure is output to the linear solenoid valve SLT, therefore, the hydraulic pressure $P_{B1}$ for the first brake is in the disengagement state. Therefore, the first brake B1 is disengaged, the second brake B2 interposed with the first one-way clutch F1 in series is engaged, and the first one-way clutch F1 is kept in an operable state.

Figure 9:
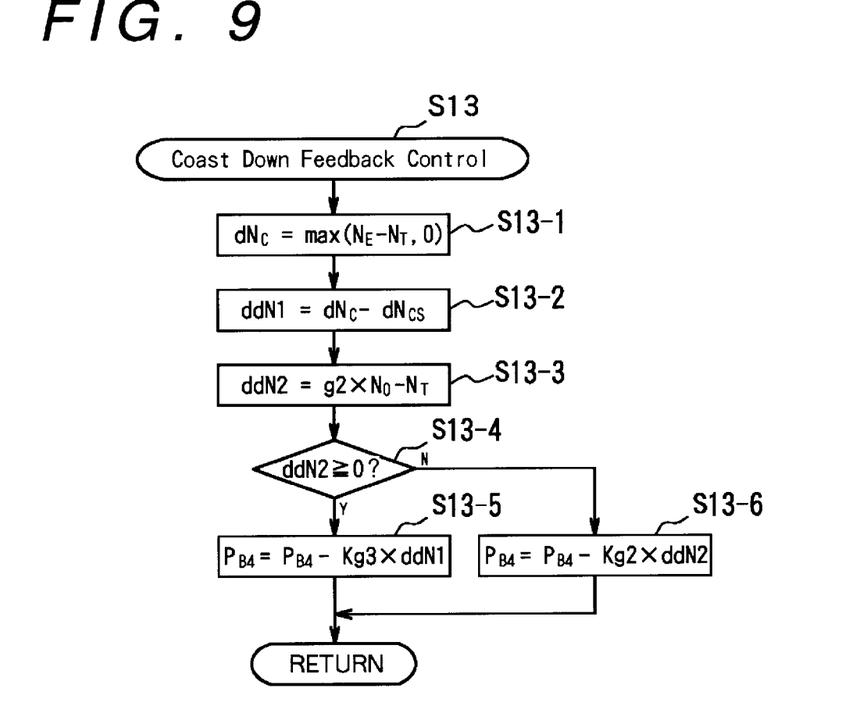
FIG. 9 is a diagram showing a flow chart showing coast down feedback control.

Next, the coast down feedback control S13 will be explained with reference to FIG. 9 and FIGS. 5 and 6. At first, a difference ($N_E-N_T$) between the engine rotation speed $N_E$ (from sensor 41) and the input rotation speed $N_T$ (from sensor 43) at the start of the shift control is calculated. Then, it is determined whether the difference is a positive value or a negative value. That is, when the engine rotation speed $N_E$ is larger than the input rotation speed $N_T$, the automatic transmission is in the drive state (positive drive state) in which the torque is transmitted from the engine to the wheels, and the difference ($N_E-N_T$) is positive value. Further, when the input rotation speed $N_T$ is larger than the engine rotation speed NE, the automatic transmission is in the driven state (negative drive state) in which the torque is transmitted from the wheels to the engine, and the difference $(N_E-N_T)$ is negative value. Then, the larger value between the difference and 0 is input as $dN_C$ (S13-1). In the driven state, 0 is input because the difference $(N_E-N_T)$ is a negative value, and as shown in FIG. 5, the hydraulic pressure $P_{B4}$ of disengagement side is kept at the piston stroke pressure $P_W$. When the deceleration rate is low, that is, when the reduction speed of the input rotation speed $N_T$ is low, the first one-way clutch F1 which is in the operation state based on the disengagement of the first brake B1 is over-run because the hydraulic pressure $P_{B4}$ of disengagement side is kept at the piston stroke pressure $P_W$ by which the torque is not transmitted. Therefore, in the driven state in the coast down shift, a shift shock and a slow-motion of the shift is prevented.

On the other hand, in the coast down shift, when the deceleration rate is large, as shown in FIG. 6, the input rotation speed $N_T$ is reduced and becomes less than the engine rotation speed $N_E$. At that time, the first one-way clutch F1 which is in the operable state because of the disengagement of the first brake B1 is engaged. Therefore, the input rotation speed $N_T$ is reduced. Therefore, the automatic transmission is in the drive state in which the engine rotation speed (idle rotation) $N_E$ is larger than the input rotation speed $N_T$. At step S13-1, the difference $(N_E-N_T)$ between the rotations at the start of the shift control is input as a value $dN_C$ and the value is made as a target value $dN_{CS}$. Further, the difference $(dN_C)$ between the engine rotation speed $N_E$ and the input rotation speed $N_T$ is input at every moment. The target value $dN_{CS}$ is compared with the current difference $dN_C$, then a first control value ddN1 $(=dN_C-dN_{CS})$ is input (S13-2).

Further, an input rotation speed $(g2^*N_0)$ after the shift is calculated based on an output rotation speed $N_0$ detected by the vehicle speed sensor 45 and gear ratio g2 after the shift (at second gear ratio), and a second control value ddN2 $(=g2^*N_0-N_T)$, which is a difference between the input rotation speed $(g2^*N_0)$ after the shift and the current input rotation speed $N_T$, is input (S13-3). Then, it is determined whether the second control value is a positive value (ddN2 ≧ 0) (S13-4).

When the second control value ddN2 is a positive value, it is determined that a synchronized rotation is not yet achieved, and the hydraulic pressure $P_{B4}$ of disengagement side is controlled by the linear throttle valve SLS based on the first control value ddN1 (S13-5). That is, when Kg3 is made to be a hydraulic pressure converting coefficient of the gear ratio (third ratio) before the shift, the hydraulic pressure $P_{B4}$ of disengagement side is compensated based on a compensational pressure which is determined based on the coefficient and the first control value $(P_{B4}-Kg3^*ddN1)$, and the hydraulic pressure $P_{B4}$ of disengagement side is reduced so that the difference $(N_E-N_T)$ between the engine rotation speed $N_E$ and the input rotation speed $N_T$ becomes a constant value. Therefore, a rotational change of the engine rotation speed $N_E$ and a rotational change of the input rotation speed $N_T$ are suppressed to a minimum, and the shift proceeds with the deceleration of the vehicle. At this time, the engine surge caused by operating the accelerator pedal again in the neutral state, based on too early reduction of the hydraulic pressure $P_{B4}$ of disengagement side, is prevented. Further, it is prevented that the shift end come late, caused by a disengagement of the hydraulic pressure $P_{B4}$ of disengagement side being late, and that the term of the engagement state becomes long.

When the second control value ddN2 is a negative value, it is determined that a synchronized rotation is achieved, and the hydraulic pressure $P_{B4}$ of disengagement side is controlled based on the second control value ddN2 (S13-6). That is to say, when Kg2 is made to be a hydraulic pressure converting coefficient of the gear ratio (second ratio) after the shift, the hydraulic pressure $P_{B4}$ of disengagement side is compensated based on a compensational pressure which is determined based on the coefficient and the second control value $(P_{B4}-Kg2^*ddN2)$, and the hydraulic pressure $P_{B4}$ of disengagement side is increased so that the input rotation speed $N_T$ reaches the input rotation speed $(g2^*N0)$ based on the gear ratio after the shift. Therefore, a shift shock in a state, in which a stroke of the piston of the hydraulic servo of engagement side is ended and the engagement of the fifth brake B5 is ended, is prevented.

Further, after the coast down shift from third ratio to second ratio, when the first brake B1 for the coasting state is engaged, the shock of engagement and an unnecessary engine brake are avoided because the first brake is engaged when the gear ratio after the shift is achieved.

This embodiment addresses the coast down shift from the third ratio to the second ratio. The control can be applied to another coast down shifts in a similar manner. The embodiment discloses use with a multistage transmission including the 3-speed main transmission mechanism and the 3-speed auxiliary transmission mechanism, however, control can be applied to another automatic transmissions.

What is claimed is:

1. A shift control device for an automatic transmission of a vehicle, comprising:

an automatic transmission mechanism changing a speed of an input rotation from an engine output shaft and changing a transmission route by disengaging and engaging a plurality of frictional engagement elements, and outputting the changed rotation speed to vehicle wheels;

hydraulic servos for engaging and disengaging each of the frictional engagement elements;

two frictional engagement elements of the plurality of frictional engagement elements directly connected to different rotational elements of the automatic transmission mechanism respectively and used for a coast down shift caused when one of the two frictional engagement elements is engaged while the other of the two frictional engagement elements is disengaged;

a drive state detecting device that detects a drive state or a driven state based on an engine rotation speed and an input rotation speed;

a hydraulic pressure adjusting device that adjusts a hydraulic pressure for at least the hydraulic servo for the other of the two frictional engagement elements which is disengaged at the coast down shift;

a frictional engagement element for a coast state connected to a predetermined rotational element, which is arranged between the engine and the rotational elements connected to the two frictional engagement elements of the plurality of frictional engagement elements in the transmission line of the automatic transmission mechanism, in parallel with an one-way clutch; and a hydraulic control device for disengaging the frictional engagement element connected to the predetermined rotational element for the coast state and outputting a control signal to the hydraulic pressure adjusting device when the coast down shift is performed.

2. The shift control device for the automatic transmission according to claim 1, wherein the hydraulic control device performs a feedback control of the hydraulic pressure for the hydraulic servo of the other of the two frictional engagement elements of the plurality of frictional engagement elements which is disengaged at the coast down shift so that the input rotation speed reaches a synchronized rotation speed, after the coast down shift is detected.

3. The shift control device for the automatic transmission according to claim 1, wherein the hydraulic control device performs a feedback control to the hydraulic pressure for the hydraulic servo of the other of the two frictional engagement elements of plurality of the frictional engagement elements which is disengaged at the coast down shift so that a difference between the engine rotation speed and the input rotation speed reaches a difference at a start of the coast down shift control when the drive state detecting device detects a drive state.

4. The shift control device for the automatic transmission according to claim 3, wherein the hydraulic control device performs a feedback control of the hydraulic pressure for the hydraulic servo of the other of the two frictional engagement elements of the plurality of frictional engagement elements which is disengaged at the coast down shift so that the input rotation speed reaches a synchronized rotation speed, after the coast down shift is detected.

5. The shift control device for the automatic transmission according to claim 1, wherein the hydraulic control device controls the hydraulic pressure for the hydraulic servo of the other of the two frictional engagement elements of the plurality of frictional engagement elements which is disengaged at the coast down shift to reach a predetermined low pressure when the drive state detecting device detects a driven state.

6. The shift control device for the automatic transmission according to claim 5, the hydraulic control device performs a feedback control of the hydraulic pressure for the hydraulic servo of the other of the two frictional engagement elements of the plurality of frictional engagement elements which is disengaged at the coast down shift so that the input rotation speed reaches a synchronized rotation speed, after the coast down shift is detected.

7. The shift control device for the automatic transmission according to claim 5, therein the hydraulic control device performs a feedback control to the hydraulic pressure for the hydraulic servo of the other of the two frictional engagement elements of the plurality of frictional engagement elements which is disengaged at the coast down shift so that a difference between the engine rotation speed and the input rotation speed reaches a difference at a start of the coast down shift control when the drive state detecting device detects a drive state.

8. The shift control device for the automatic transmission according to claim 7, wherein the hydraulic control device performs a feedback control of the hydraulic pressure for the hydraulic servo of the other of the two frictional engagement elements of the plurality of frictional engagement elements which is disengaged at the coast down shift so that the input rotation speed reaches a synchronized rotation speed, after the coast down shift is detected.

\* \* \* \* \*